United States Patent [19]
Boutonnat

[11] 3,887,335
[45] June 3, 1975

[54] ELECTRICAL MEASURING AND MONITORING APPARATUS UTILISING A REMOTE DETECTOR

[75] Inventor: Maurice Boutonnat, Verneuil-En-Halatte, France

[73] Assignees: Charbonnages de France, Paris; MSA de France, Asnieres, both of France

[22] Filed: Nov. 27, 1973

[21] Appl. No.: 419,371

[30] Foreign Application Priority Data
Nov. 29, 1972 France .................. 72.42382

[52] U.S. Cl. .................. 23/254 E; 73/27; 323/19
[51] Int. Cl. ....... G01n 27/16; G05f 1/40; G05f 1/60
[58] Field of Search .......... 23/254 E, 255 E, 232 E; 73/27; 323/19, 75 N

[56] References Cited
UNITED STATES PATENTS

| | | | |
|---|---|---|---|
| 3,239,828 | 3/1966 | Peterman | 23/254 E X |
| 3,503,261 | 3/1970 | Riester et al. | 323/75 N X |
| 3,517,556 | 6/1970 | Barker | 323/75 N X |
| 3,742,342 | 6/1973 | Schick | 323/19 X |
| 3,764,880 | 10/1973 | Rose | 323/75 N |

Primary Examiner—Robert M. Reese
Attorney, Agent, or Firm—Waters, Schwartz & Nissen

[57] ABSTRACT

An apparatus for measuring and monitoring the combustible gas content of a gaseous mixture, for example in a mine, comprises a detector for location remote from a measuring and monitoring unit. A control circuit in the measuring unit maintains a constant voltage at sensing elements of the detector regardless of the length of cable connecting the detector to the measuring unit.

3 Claims, 2 Drawing Figures

ELECTRICAL MEASURING AND MONITORING APPARATUS UTILISING A REMOTE DETECTOR

BACKGROUND OF THE INVENTION

1. Field of the Invention

The invention relates to improvements in apparatus for measuring or monitoring a parameter, in which a measuring detector is fed with direct current and comprises at least one sensing element one of whose characteristics evolves as a function of the fluctuations of the value of the monitored parameter, this evolution entailing directly or indirectly the variation of a direct voltage which is the measuring signal and the value of which is either measured or compared with a constant reference voltage.

2. Description of the Prior Art

Such apparatus has in the past included a measuring and monitoring unit and a detector, which are connected together by conductors in order to enable the detector to be installed at a remote site so as to be able to make the measurement or effect the monitoring from a distance. A cable containing electric conductors supplies the detector with electric current and transmits to the measuring unit, in the form of a direct voltage, the information received by the detector. These conductors of the cable connecting the measuring detector to the measuring unit introduce voltage drops in the line both for the supply current and for the measuring signal, so that it is necessary to effect adjustments, which are generally lengthy and meticulous, in order to compensate for these voltage drops.

In some of these apparatus, it is in addition necessary for the detector to be fed with constant voltage at its terminals. It is relatively easy to conceive adjustable voltage regulating circuits and to make the abovementioned adjustments when the detector forms an integral part of the apparatus or has to be installed at a fixed distance from the remainder of the apparatus. This, however, is not the case when the detector is intended to be installed in positions whose distance from the measuring unit may vary very considerably. The range of variation of the electric characteristics of the conductors of the connecting cable makes it impossible to effect the compensating adjustments with strict regard only to the variation of the drop of voltage in the line, calculated from the value of the supply current and the characteristics of the type of cable used.

It would be conceivable to employ two operators to effect the adjustment every time the detector is placed in a new situation, one operator being at the detector in order to verify the voltage actually applied to the terminals of the detectors, and the other operator being at the measuring unit in order to effect suitable adjustments in dependence on the information supplied by the first operator. This method of working requires means of communication at the disposal of the two operators. It is slow and expensive and does not exclude errors of interpretation due to defective communication.

It has already been proposed to provide the detector itself with a voltage control circuit. Apart from the fact that this complicates the detector and increases its dimensions, it has no effect on the degradation of the measurement signal resulting from the distance of the detector, and this constitutes a serious disadvantage.

A main object of the present invention is to provide an apparatus in which the detector and the measuring unit can be located at any arbitrary distance from one another and can be connected by a cable of suitable length, without entailing the disadvantages of known apparatuses and in particular without degradation of the measurement signal.

SUMMARY

The invention provides electrical apparatus for measuring and monitoring a parameter comprising a measuring and monitoring unit and a detector connected together by a cable with a control circuit in the measuring unit which is operable to maintain a constant voltage at the terminals of sensitive elements of the detector. The measuring unit, including the control circuit, and the measurement signal have as reference potential the potential of a floating ground, and the value of the reference potential is servo-controlled so as to be equal to the value of the potential of the detector feed output.

In this way, automatic compensation is obtained without regulation of modifications of the measurement signal which occur when the detector is located at different distances from the measuring and monitoring unit.

BRIEF DESCRIPTION OF THE DRAWINGS

Two embodiments of the invention will now be described, by way of example, with reference to the accompanying drawings in which.

DETAILED DESCRIPTION

Figure 1:
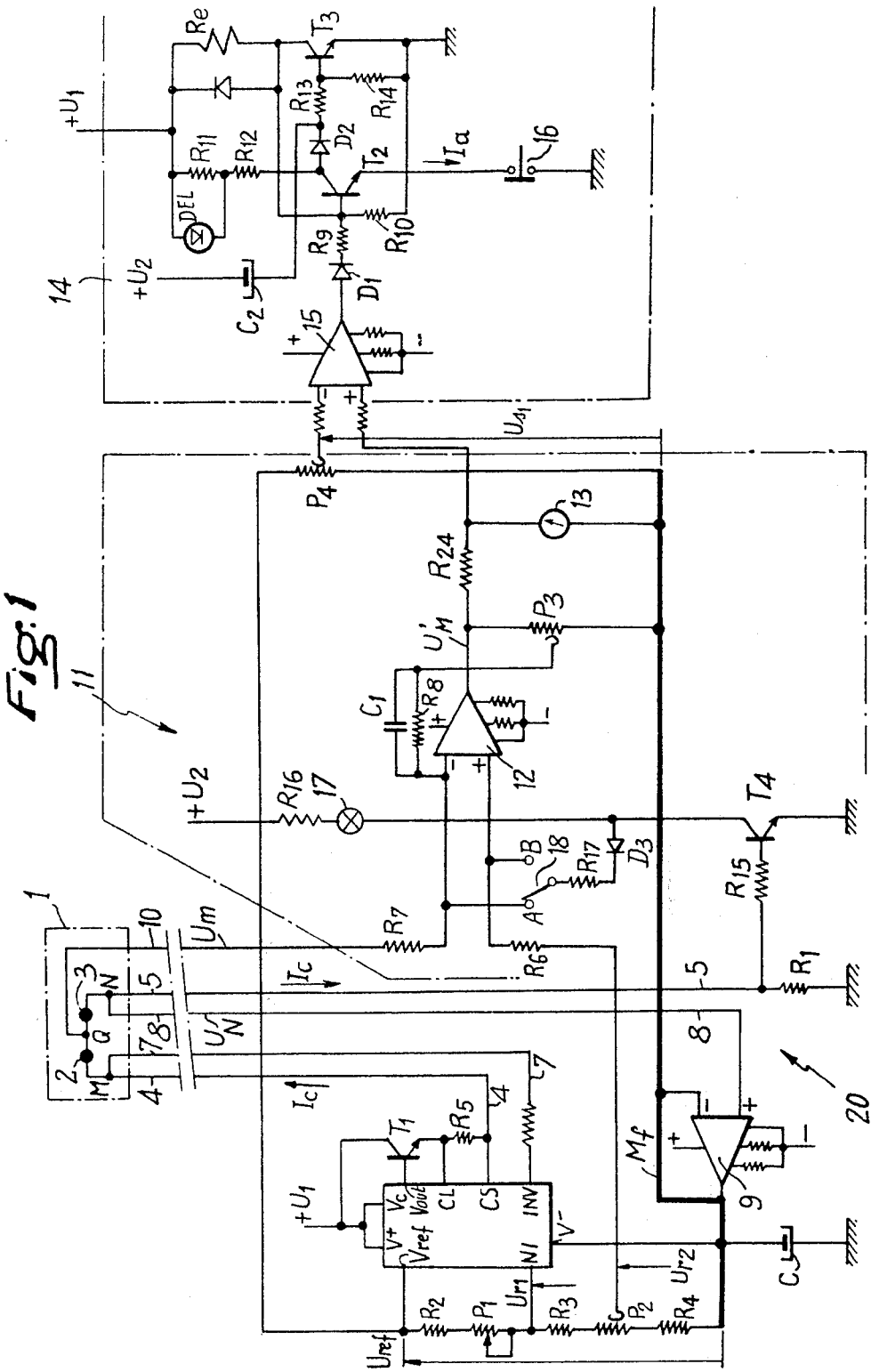
FIG. 1 is a diagram of an electrical measuring and monitoring apparatus according to the invention, associated with a load circuit.

In the two figures of the drawing there is shown a measuring apparatus comprising a measuring unit indicated by the general reference 20 and a measuring detector indicated by the general reference 1. The measuring unit and detector are connected together by a cable consisting of five conductors. The measuring unit 20 embodies a control device which is in functional relationship both with the detector and with a load circuit 11 contained in the measuring unit. The output of the load circuit 11 is connected to a triggering and/or alarm circuit or circuits 14, 19.

The functional assembly consisting of the detector and the control device of the measuring unit will be described first. In the apparatus shown in FIG. 1 the measuring detector 1 comprises a catalytic sensing element 2 and a compensator element 3, these elements being connected in series, having a common point Q, and being fed with direct current $I_c$ by a heating unit comprising a voltage source ($+ U_1$), not shown, a voltage control device described below, an output conductor 4 connected to the free end M of the detector element 2 (hot spot of the detector), and a return conductor 5 connecting the free end N of the compensator element 3 (cold spot of the detector) to the ground of the remainder of the apparatus by means of a biassing resistor $R_1$, the purpose of which will be explained later on.

The detector 1 is adapted to monitor and/or measure the combustible gas content of a gaseous mixture. For this purpose catalytic beads of known type are used as sensing and compensator elements. The beads 2 and 3 and the heating current are so selected that the combustible gas burns on or near the bead 2, but does not burn on the bead 3; consequently, the electric resistance of the bead 2 rises, while the electric resistance of the bead 3 varies only in dependence on the actual temperature of the gaseous mixture, the variation of the electric resistance of the bead 2, which represents the combustible gas content of the gaseous mixture, results in a variation of the voltage at its terminals, as is known per se The voltage control device comprises an integrated circuit 6 of a type known per se (e.g., S.G.S.L.123T1), and is fed by the voltage source $U_1$, the different connections of this circuit to the remainder of the apparatus being as follows:

a. its inputs $V^+$ and $V_c$ are connected to the source + $U_1$;
b. its output $V^-$ is connected to the positive plate of a polarized capacitor C whose negative plate is connected to ground;
c. its output $V_{ref}$ is connected to the positive plate of the capacitor C by means of a circuit comprising, connected in series, a resistor $R_2$, a potentiometer $P_1$ connected as a rheostat, a resistor $R_3$, a potentiometer $P_2$, and a resistor $R_4$;
d. its non-inverting input NI is connected to a point common to $P_1$ and $R_3$;
e. its output $V_{out}$ is connected to the base of a ballast transistor $T_1$ of the NPN type whose collector is connected to + $U_1$, while its emitter is connected in series with a resistor $R_5$ and the conductor 4 of the heating circuit of the measuring pick-up circuit 1; and
f. its current limitation outputs CL and CS are connected to the ends of the resistor $R_5$.

In addition:

g. the hot spot M of the detector 1 is connected to the inverting input INV of the integrated circuit 6 by means of a conductor 7;
h. a conductor 8 connects the cold end N of the detector to one of the inputs of an operational amplifier 9, of which the other input and the output are connected directly to the positive plate of the capacitor C, the operational amplifier 9 being thus connected as an emitter-follower or impedance reducer; and
i. the point Q common to the two beads 2 and 3 is connected by means of a conductor 10 to a load circuit 11 the composition of which is described later on.

In the circuit which has just been described the positive plate of the capacitor C constitutes the floating ground $M_f$. The control circuit 6 permanently supplies at its output $V_{ref}$ a voltage $U_{ref}$ of constant value in relation to the potential of the floating ground. It follows that the fraction $U_{r1}$ available at the point common to $P_1$ and $R_3$ and applied to the input NI of the circuit 6 and also the fraction $U_{r2}$ available on the slider of $P_2$ has values which are constant in relation to the potential of the floating ground.

Because of the high impedance of the imputs INV and NI of the integrated circuit 6, resulting from the design, only a minute current passes through the conductors 7 and 8 and the voltage drop in these two conductors is negligible. It follows that the potential of the end of the conductor 7 which is connected to the input INV of 6 is the potential of the hot spot M of the detector and that the potential of the end of the conductor 8 which is connected to the operation amplifer 9 is the potential of the cold spot N of the detector 1.

The heating current circulating in the circuit 4 – 2 – 3 – 5 brings the cold spot N to a potential dependent on the length of the conductor 5, and the operational amplifier 9 brings the floating ground to the same potential.

By automatically controlling the voltage $V_{out}$ adjusting the conduction of the ballast transistor $T_1$ the integrated circuit 6 subjects the voltage ($U_M$ - $U_{Mf}$) to servo-control and therefore causes the voltage ($U_M$ - $U_N$) to remain equal to the reference voltage $U_{r1}$ applied to its input NI.

The measuring signal $U_m$ constituted by the voltage ($U_Q$ - $U_N$) is transmitted by means of a conductor 10 to the load circuit 11 forming part of the measuring unit, The load circuit 11 comprises:

a. an amplifier circuit comprising an operational amplifier 12 whose "plus" input is connected to the slider of the potentiometer $P_2$ by means of a resistor $R_6$ and whose "minus" input is connected to the conductor 10 by means of a resistor $R_7$, while its gain is adjusted in a manner known per se by means of the circuit containing the potentiometer $P_3$ connecting the output of the operational amplifier 12 to the floating ground and a counter-reaction circuit $R_8$ - $C_1$ connecting the cursor off the potentiometer $P_3$ to the "minus" input of the operational amplifier 12;
b. a load resistor $R_{24}$ and a measuring device namely the galvanometer 13 connected to the floating ground;
and
c. a potentiometer $P_4$ connected between the output $U_{ref}$ of 6 and the floating ground and supplying an adjustable threshold voltage $U_{s1}$ available between its cursor and the floating ground.

When the detector is in pure air the voltage ($U_Q$ - $U_N$) has a value + $U_{mo}$ and the voltage $U_{r2}$ available on the slider $P_2$ is adjusted to a value such that the operational amplifier 12 supplies no voltage. When the detector is in a mixture of air and combustible gas, the combustion of the combustible gas on the bead 2 brings about an increase of the resistance of this bead 2, while the resistance of the beam 3 does not vary. The voltage $U_M$ - $U_N$ being kept constant, the voltage $U_m = U_Q$ - $U_M$ assumes a positive value lower than $U_{mo}$. The positive voltage $U_{r2}$ - $U_m$ is amplified by the operational amplifier 12 and the positive voltage $U'_m$ supplied by the latter brings about deflection of the galvanometer 13 proportional to the combustible gas content of the gaseous mixture in which the detector is immersed.

As stated above, the load circuit 11 is connected to an alarm triggering circuit 14, which comprises:

a. an operational amplifier 15 connected as a trigger circuit whose "plus" input is connected to the output of the operational amplifier 12, while its "minus" input is connected to the slider of the potentiometer $P_4$;
b. a transistor $T_2$ of the NPN type, whose base is connected to the output of the operational amplifier 15 by means of a resistor $R_9$ and a diode $D_1$ whose anode is connected to the operational amplifier 15; and whose base is connected to ground by a resistor $R_{10}$ having a relatively high resistance, the collector of $T_2$ being connected to + $U_1$ by means of a visual indicating circuit consisting of the resistors $R_{11}$ and $R_{12}$, which are connected in series, and the electroluminescent diode DEL connected to the terminals of $R_{12}$, the emitter of $T_2$ being connected to the ground of the apparatus by means of a normally closed switch 16;

c. a transistor $T_3$ of the NPN type, whose base is connected to the collector of transistor $T_2$ by means of a resistor $R_{13}$ and a diode $D_2$ whose anode is connected to the emitter of $T_2$; and whose base is connected ground by means of a high value resistor $R_{14}$, the emitter of $T_3$ being connected to $+ U_1$ by means of the coil of a polarized release relay Re, and to the base of $T_2$, the collector of $T_3$ being connected to ground; and d. a time-delay capacitor $C_2$ connecting the point common to $D_2$ and $R_{13}$ to a controlled voltage source $+ U_2$.

The elements of the circuit are so designed that as long as the voltage $U'_m$ supplied by the operational amplifier 12 is lower in absolute value than the constant voltage $U_{s1}$ available on the slider of $P_4$ the trigger circuit 14 is in the state of rest, the transistor $T_2$ is in the blocked state, the transistor $T_3$ is saturated, the relay Re is permanently energized, and the capacitor $C_2$ has its two plates brought to positive potentials.

When the combustible gas content of the monitored gaseous mixture increases, the voltage $U'_M$ rises and, as has been seen above, brings about the deflection of the galvanometer 13.

When this content attains a value such that $U'_M$ is equal to $U_{s1}$ (critical or threshold alarm value), the trigger circuit 15 switches to the working state and makes $T_2$ conductive, causes the electroluminescent diode DEL to light up, and causes $C_2$ to be charged by the base current of $T_3$, thus maintaining $T_3$ in the conductive state.

At the end of the delay time determined by the time constant of the arrangement $C_2 - R_{13} - R_{14}$, $T_3$ is blocked and the relay Re is no longer energized and triggers an alarm.

The conduction of $T_2$ and the blocking of $T_3$ are still maintained by the base current Ia of $T_2$, which continues to flow even if the trigger circuit 15 returns to the state of rest as the result of the lowering of the combustion gas content of the monitored gaseous mixture. This locking of the alarm is cancelled by opening the base circuit of $T_2$ by means of the switch 16, this operation being possible only if the combustible gas content has once again fallen below the critical value.

The apparatus is completed by a circuit used to detect a fault in the detector and in its supply circuit. This circuit comprises:

a. the resistor $R_1$;

b. a switching transistor $T_4$ whose base is connected to the hot spot of $R_1$ by means of a resistor $R_{15}$, its emitter being connected to ground and its collector being connected to a voltage source $+ U_2$ by way of a pilot light 17 and a resistor $R_{16}$;

c. a diode $D_3$ the anode of which is connected to the point common to 17 and $T_4$, and which is connected in series with a resistor $R_{17}$; and d. an inverter 18 enabling the arrangement $D_3 - R_{17}$ to be connected either to the "minus" input of the operational amplifier 12 to which the measuring signal is applied (position A shown in FIG. 1), or to the "plus" input of the operational amplifier 12 to which the voltage $U_{r2}$ is applied (position B).

During normal operation the heating current of the beads passes through the resistor $R_1$ and makes the transistor $T_4$ conductive. The pilot light 17 is lit up and no voltage is returned by the arrangement $D_3 - R_{17}$ to the amplifier 12.

In the event of the fracture of a bead or of one of the conductors 4, 5, the transistor $T_4$ is blocked and the pilot light 17 extinguished. In addition, a positive voltage appears on the anode of $D_3$.

It follows that if the inverter 18 is placed in position A, this voltage is amplified and inverted by the operational amplifier 12 and it causes the galvanometer 13 to deflect to the negative limit (below zero), but does not trigger the operational amplifier 15 or energize the relay Re. If the inverter 18 is placed in position B, this voltage is amplified without being inverted and causes the galvanometer 13 to deflect to the positive limit, and brings about the triggering of the operational amplifier 15 and the energization of the relay Re. In the latter case the triggering of the alarm may indicate either that the content has attained the critical value or that the measuring head has a defect.

The uncertainty is resolved by examining the state of the pilot lamp 17, the diode DEL, and the galvanometer 13.

Figure 2:
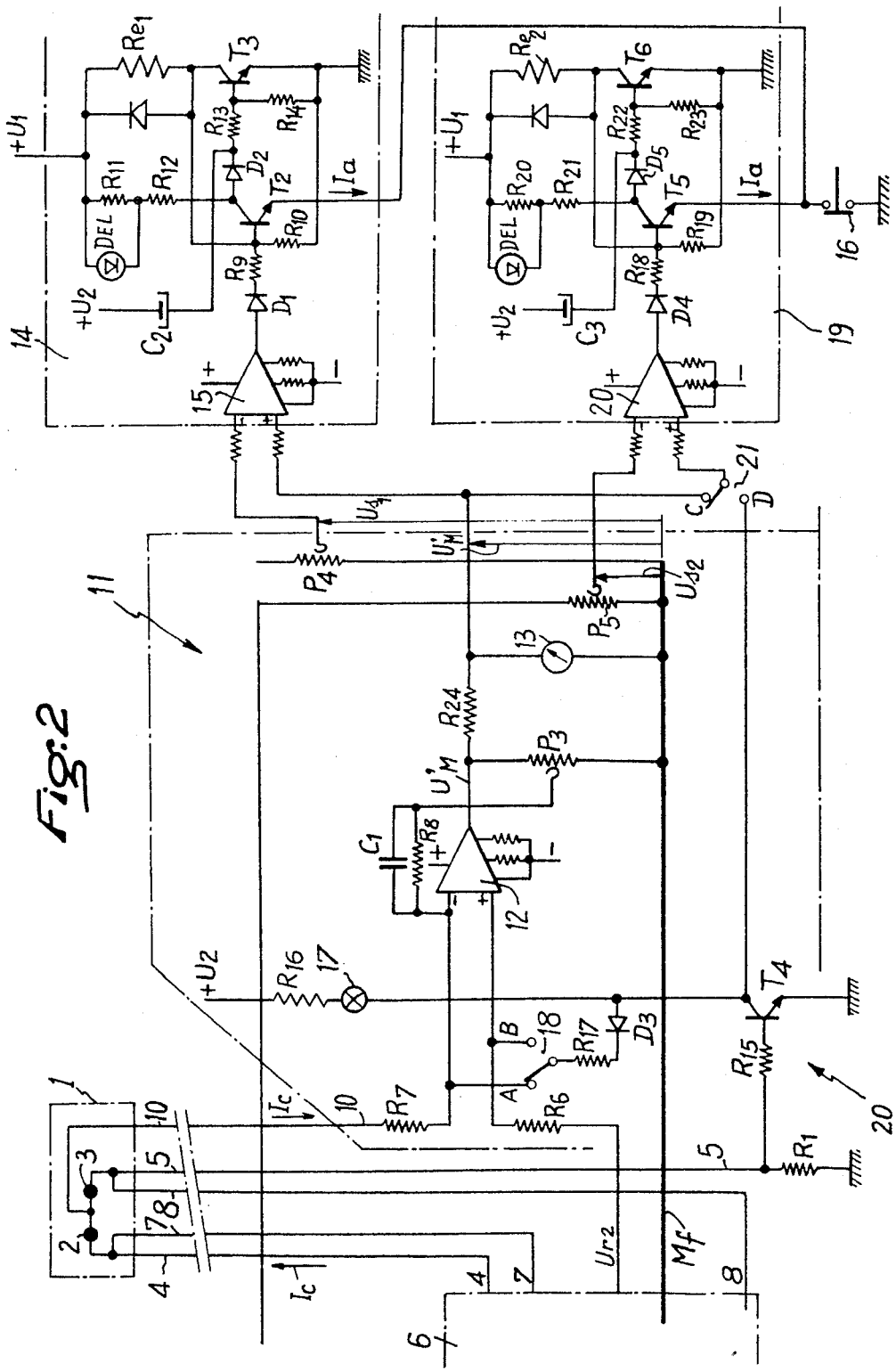
FIG. 2 shows part of the circuit diagram of an alternative form of the same apparatus, associated with two load circuits.

The modified embodiment illustrated in FIG. 2 is distinguished from the embodiment just described by the fact that it comprises a second triggering circuit 19 comprising the same elements as the triggering circuit 14, while the potentiometer $P_5$ is so adjusted that the voltage $U_{s2}$ available on its slider is higher than $U_{s1}$. In addition, the "plus" input of the trigger circuit 22 may be connected by means of an inverter 21 either to the output circuit of the amplifier 12 (position C) or to the collector of $T_4$ (position D). Furthermore, the switch 16 is common to the two triggering circuits 14 and 19.

With the inverter 21 in position D when the combustible gas content attains a value such that $U_M = U_{s1}$, the triggering circuit 14 acts in the manner explained above, but the triggering circuit 19 does not act. When the content attains the higher value such that $U_M = U_{s2}$, the two triggering circuits 14 and 19 act simultaneously. The apparatus has therefore available a pre-alarm triggering circuit 14 and an alarm triggering circuit 19. When the inverter is in the position D, only the circuit 14 can act.

With regard to the fault detection circuit, when the inverter 18 is in position A and the inverter 21 is in the position C, a fault in the detector entails only the extinction of the pilot light 17 and the deflection of the galvanometer 13 to the negative stop.

When the inverter 18 is in the position B and the inverter 21 is in the position C, a fault in the measuring pick-up entails the extinction of the pilot light 17, the deflection of the galvanometer 13 to the positive stop, and the operation of the two alarms.

When the inverter 18 is in the position A and the inverter 21 is in the position D, a fault in the detector entails the extinction of the light 17, the deflection of the galvanometer 13 to the negative stop, and the operation of the triggering circuit 19.

It is therefore seen that in the second case just described it is not possible to ascertain the cause of the triggering of the alarms except by simultaneously examining the state of the pilot light 17, that of the diodes DEL, and that of the galvanometer.

On the other hand, in the last case the triggering only of the alarm controlled by the circuit 19 indicates that the detector has a defect, while the triggering only of the alarm controlled by the circuit 14 indicates that the combustion gas content has reached the critical threshold.

The potential of the floating ground $M_f$ being servo-controlled so as to be equal to that of the cold spot N of the detector, and the reference potential of the control circuit 6 and of the load circuit 11 being the reference potential the relative values of ($U_M - U_N$), $U_m$, $U_{r2}$, $U'_m$, $U_{s1}$ and $U_{s2}$ do not vary, all other circumstances being equal, when the length of the cable containing the conductors 4, 5, 7, 8, and 10 changes. If follows that the many controls, control of zero by adjustment of $U_{r2}$; control of sensitivity by adjusting the amplification coefficient of the operational amplifier 12 by means of the potentiometer $P_3$; control of the triggering thresholds by adjusting the values $U_{s1}$ and $U_{s2}$; can be effected with the detector connected directly to the measuring unit.

The apparatus which has just been described above is provided with a measuring detector consisting of two catalytic beads connected in series. The invention is applicable to different detectors, for example a Wheatstone bridge, provided that they are fed with direct current and that they supply directly or indirectly a direct voltage representing the parameter monitored.

In practice, the apparatus according to the invention is distinguished from known apparatuses by the ability to transmit and receive unaltered signals at distances which are considered as very great in industrial or mining operations such as, for example, up to several kilometres.

I claim:

1. An electrical apparatus for measuring and monitoring a parameter, comprising measuring and monitoring means for generating a measurement signal, detector means adapted for connection to said measuring and monitoring means and adapted for being spaced at a distance therefrom, conductors connecting said measuring and monitoring means and said detector means and feeding voltage and current to the detector means and transmitting to the measuring and monitoring means information obtained by the detector means, said measuring and monitoring means including a supply source for feeding direct current to the detector means and including a control circuit coupled to and operable to maintain a constant voltage at the detector means, said detector means including sensing elements adapted to generate a measurement signal in the form of a direct voltage, and a servo-controlled floating ground connected to said measuring and monitoring means and controlled at least in part thereby to provide for said measuring and monitoring means a reference potential which is controlled to be at least substantially equal to the voltage applied to the detector means.

2. A measuring and monitoring apparatus according to claim 1, comprising an emitter-follower circuit having a high input impedance, the control circuit being connected to said floating ground and to said supply source of the detector means, said detector means including a supply output connected firstly to ground and secondly to the floating ground by means of said emitter-follower circuit, said detector means including a supply input, the control circuit comprising a circuit having a high impedance input and an auxiliary conductor connecting the same to the supply input of the detector to servo-control the potential of the said supply input in relation to the floating ground so as to keep it equal to a reference potential kept constant in relation to the potential of the floating ground, and a load circuit means which receives the measurement signal from said measuring and monitoring means, said load circuit means having as a reference potential the potential of the floating ground.

3. An apparatus according to claim 1 for measuring and monitoring the combustible gas content of a gaseous mixture, wherein the sensing elements of the detector means include a measuring catalytic bead in contact with which the combustible gas burns and a reference catalytic bead connected in series with said measuring catalytic bead, the two said beads having a common point connected to the load circuit means, the measuring bead including a free end constituting the supply input of the detector means, the reference bead having a free end constituting the supply output of the detector.

* * * * *